US009698943B2

(12) United States Patent
Le et al.

(10) Patent No.: US 9,698,943 B2
(45) Date of Patent: Jul. 4, 2017

(54) RECEIVING UNIT IN A WIRELESS COMMUNICATION NETWORK AND METHOD FOR GENERATING AN AUTOMATIC REPEAT REQUEST FEEDBACK MESSAGE

(75) Inventors: Yan Qun Le, Beijing (CN); Yi Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 575 days.

(21) Appl. No.: 12/995,716

(22) PCT Filed: Jun. 5, 2008
(Under 37 CFR 1.47)

(86) PCT No.: PCT/EP2008/056984
§ 371 (c)(1),
(2), (4) Date: May 3, 2011

(87) PCT Pub. No.: WO2009/146745
PCT Pub. Date: Dec. 10, 2009

(65) Prior Publication Data
US 2013/0070686 A1     Mar. 21, 2013

(51) Int. Cl.
*H04L 1/18*     (2006.01)
*H04W 4/00*     (2009.01)
*H04L 1/16*     (2006.01)

(52) U.S. Cl.
CPC .......... *H04L 1/1825* (2013.01); *H04L 1/1854* (2013.01); *H04L 1/1664* (2013.01); *H04L 1/1812* (2013.01)

(58) Field of Classification Search
CPC .... H04L 1/1864; H04L 1/1854; H04L 1/1825
(Continued)

(56) References Cited

U.S. PATENT DOCUMENTS 5,245,616 A * 9/1993 Olson .................. H04L 1/1607
370/394
6,208,620 B1    3/2001 Sen et al.
(Continued)

FOREIGN PATENT DOCUMENTS

CN         1437807 A     8/2003
WO    WO 01/80476 A1   10/2001

OTHER PUBLICATIONS

IEEE 802.16e-2005, "IEEE Standard for Local and Metropolitan Area Networks—Part 16: Air Interface for Fixed and Mobile Broadband Wireless Access Systems," Feb. 28, 2006, (864 pages).
(Continued)

*Primary Examiner* — Gregory Sefcheck
*Assistant Examiner* — Jael Ulysse
(74) *Attorney, Agent, or Firm* — Harrington & Smith

(57) ABSTRACT

The invention relates to a receiving unit in a wireless communication network comprising a processing unit being configured to generate Automatic Repeat request (ARQ) feed-back messages for acknowledgement or negative acknowledgement of received data units in a wireless communication channel. In order to avoid signalling overhead, it is proposed that said processing unit is further configured to delay the generation of Automatic Repeat request (ARQ) feedback messages until the processing unit has recognized irregularities in the data transmission or until the number (C) of delayed Automatic Repeat request (ARQ) feedback messages has reached a threshold value.

14 Claims, 2 Drawing Sheets

(58) Field of Classification Search
USPC ........ 370/216, 252, 310, 329, 328; 714/748, 714/749; 455/453, 561
See application file for complete search history.

(56) References Cited

U.S. PATENT DOCUMENTS

| | | | |
|---|---|---|---|
| 7,444,169 B2* | 10/2008 | Ishii et al. ................ | 455/561 |
| 8,532,081 B1* | 9/2013 | Narasimhan et al. ........ | 370/343 |
| 2002/0080719 A1* | 6/2002 | Parkvall ................ | H04L 1/0001 370/235 |
| 2002/0159396 A1* | 10/2002 | Carlson ................ | H04L 1/1848 370/252 |
| 2002/0172208 A1* | 11/2002 | Malkamaki ........... | H04L 1/0083 370/400 |
| 2003/0100268 A1* | 5/2003 | Moulsley .............. | H04L 1/0017 455/69 |
| 2003/0118031 A1* | 6/2003 | Classon et al. ......... | 370/395.54 |
| 2004/0067757 A1* | 4/2004 | Fukui .................. | 455/453 |
| 2004/0088634 A1* | 5/2004 | Kim et al. .............. | 714/752 |
| 2005/0063344 A1* | 3/2005 | Winzell ................ | 370/335 |
| 2005/0094667 A1* | 5/2005 | Dahlman ............... | H04L 1/1819 370/473 |
| 2005/0143114 A1* | 6/2005 | Moulsley .............. | H04L 1/1692 455/522 |
| 2005/0201354 A1* | 9/2005 | Hosaka ................ | H04L 1/1887 370/349 |
| 2005/0207354 A1* | 9/2005 | Nekovee et al. ........ | 370/260 |
| 2005/0235190 A1* | 10/2005 | Miyazaki .............. | H04L 1/1812 714/748 |
| 2005/0251722 A1* | 11/2005 | Terry .................. | H04L 1/1812 714/749 |
| 2005/0286451 A1* | 12/2005 | Kim .................... | H04W 8/26 370/310 |
| 2006/0013257 A1* | 1/2006 | Vayanos ............... | H04L 1/1854 370/473 |
| 2006/0050742 A1* | 3/2006 | Grandhi et al. ........ | 370/506 |
| 2006/0067222 A1* | 3/2006 | Endoh ................. | H04L 69/163 370/231 |
| 2006/0133273 A1* | 6/2006 | Julian et al. ............ | 370/230 |
| 2006/0136790 A1* | 6/2006 | Julian et al. ............ | 714/704 |
| 2006/0154603 A1* | 7/2006 | Sachs et al. ............ | 455/39 |
| 2007/0168822 A1* | 7/2007 | Vitebsky .............. | H04L 1/0017 714/748 |
| 2007/0168826 A1* | 7/2007 | Terry .................. | H04L 1/1812 714/748 |
| 2007/0245201 A1* | 10/2007 | Sammour et al. ....... | 714/748 |
| 2007/0274342 A1* | 11/2007 | Kim .................... | H04L 1/1607 370/473 |
| 2008/0101285 A1* | 5/2008 | Venkatachalam ..... | H04L 1/1607 370/329 |
| 2008/0108303 A1* | 5/2008 | Okuda ................. | H04B 7/155 455/7 |
| 2009/0086657 A1* | 4/2009 | Alpert et al. ........... | 370/310 |
| 2009/0185477 A1* | 7/2009 | Lee et al. .............. | 370/216 |
| 2011/0299476 A1* | 12/2011 | Fischer ................ | 370/328 |

OTHER PUBLICATIONS

IEEE 802.16-2004, "IEEE Standard for Local and Metropolitan Area Networks—Part 16: Air Interface for Fixed Broadband Wireless Access Systems," 2004, (893 pages).

Ruy De Oliveira et al: "A Smart TCP Acknowledgment Approach for Multihop Wireless Networks", IEEE Transactions on Mobile Computing, IEEE Service Center, Los Alamitos, CA, IS, vol. 6, No. 2, Feb. 1, 2007 (Feb. 1, 2007), pp. 192-205; XP011152482; ISSN: 1536-1233.

* cited by examiner

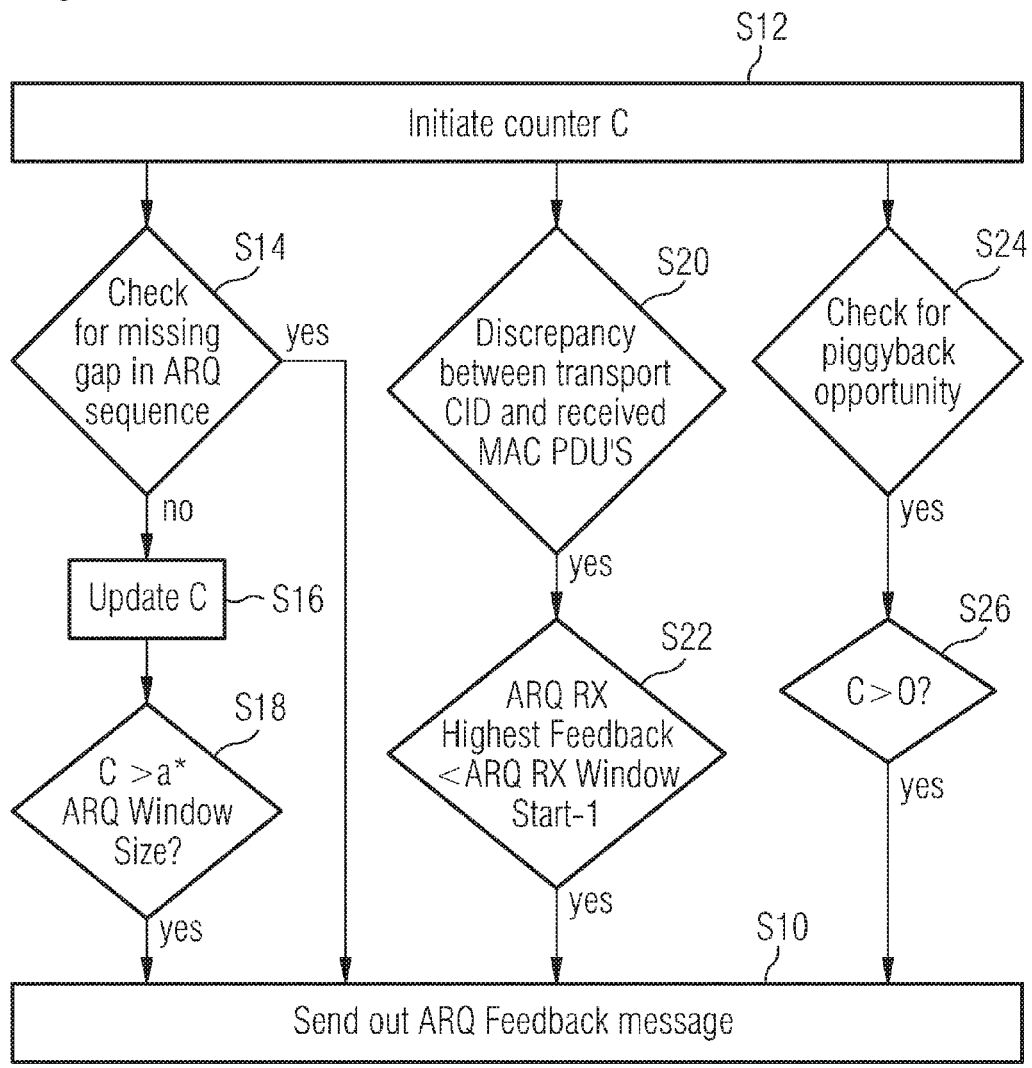

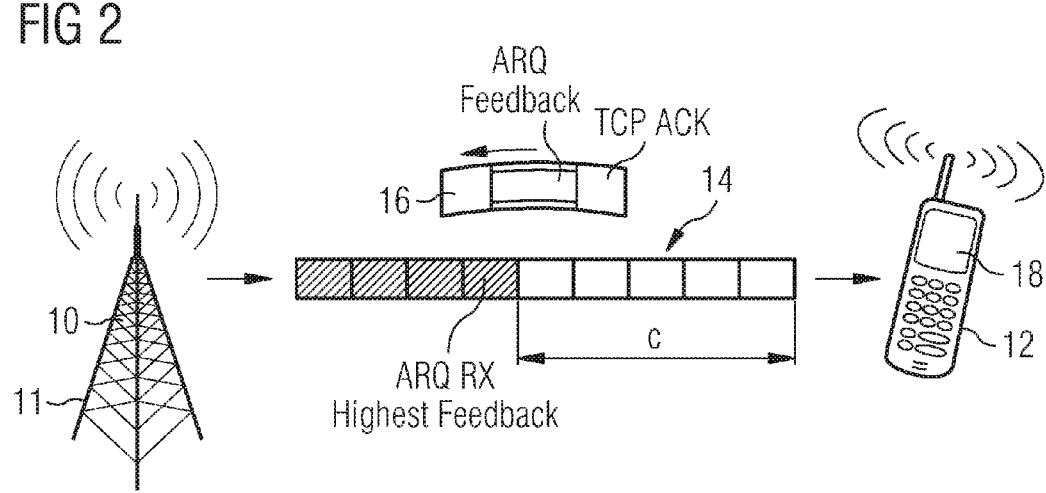

RECEIVING UNIT IN A WIRELESS COMMUNICATION NETWORK AND METHOD FOR GENERATING AN AUTOMATIC REPEAT REQUEST FEEDBACK MESSAGE

1. Field of the Invention

The invention relates to receiving units in a wireless communication network and to a method for generating automatic repeat request (ARQ) feedback messages for acknowledgement or negative acknowledgement (ACK/NACK) of received data units in a wireless communication channel.

2. Background of the Invention

In packet-based wireless communication networks, automatic repeat request (ARQ) methods are employed to perform error control. These methods employ acknowledgement and time-outs to achieve reliable data transmission. An acknowledgment message sent by the receiving unit to the transmitting unit indicates that the data frame or packet has been correctly received. If the sender does not receive an acknowledgment message before a predetermined time-out, it retransmits the frame or packet until it receives an acknowledgment or exceeds a predefined number of retransmissions. In WiMAX systems according to the IEEE specification 802.16 ("IEEE Standard for Local and Metropolitan Area Networks—Part 16: Air Interface of Fixed Broadband Wireless Access Systems"), ARQ is defined in a MAC layer, which improves the system performance by retransmitting MAC ARQ blocks that have been lost or garbled. ARQ may be enabled on a per-connection basis.

According to the above mentioned standards, the perconnection ARQ shall be specified and negotiated during connection creation. The ARQ feedback information can be sent as a standalone MAC management message on the appropriate basic management connection or it can be piggybacked on an existing connection. The ARQ feedback cannot be fragmented. The frequency of ARQ feedback is not specified in the standard and is left for implementation.

If the ARQ feedback is sent as an independent MAC management message, this message has to be of type 33. In order to give an efficient feedback to expedite the ARQ process, previous attempts have assumed that the ARQ receiving unit would send a feedback message after every frame. However, a high feedback frequency leads to an increased radio resource occupation. Especially when the ARQ direction is downlink, which is the usual scenario in current mobile networks, the feedback message has to be sent in a standalone MAC message with bandwidth request contention unless there is a way to piggyback the feedback information. On the other hand, if the feedback frequency is too low, the ARQ transmitter may be blocked because of the lack of feedback in time.

3. SUMMARY OF THE INVENTION

The invention tries to provide a receiving unit and a method for generating ARQ feedback messages being capable for suitably selecting and adapting the feedback frequency of the ARQ scheme. The invention seeks to provide an adaptive feedback method and a device implementing such a method, which is suitable for reducing the transmission overhead without deteriorating the ARQ performance.

The invention starts from a receiving unit in a wireless communication network comprising a processing unit being configured to generate automatic repeat request (ARQ) feedback messages for acknowledgment or negative acknowledgment of received data units in a wireless communication channel.

According to a first aspect of the invention, it is proposed that the processing unit is further configured to delay the generation of automatic repeat request (ARQ) feedback messages until the processing unit has recognized the irregularities in the data transmission or until the number of delayed automatic repeat request feedback messages has reached a predetermined threshold value. Accordingly, the processing unit generates the ARQ feedback messages only if the necessity to do so is apparent. The result is a variable ARQ feedback frequency, which is adapted to the circumstances, in particular to the channel quality.

If the channel quality is poor, many irregularities will be detected, such that many feedback messages will be generated. On the other hand, if no irregularities occur, only a minimum number of feedback messages determined by the threshold value will be generated, such that the time-out will not be exceeded in the transmitting unit and that an unnecessary retransmission may be avoided.

Moreover, it is proposed that the processing unit is configured to store a variable pointing at the highest numbered ARQ block for which an ARQ feedback message has been sent out. Due to this variable, the processing unit can always keep track on which data packets have already been acknowledged in a very simple way, even if the feedback frequencies are varying.

Moreover, it is proposed that the irregularities recognized by the processing unit include missing or erroneous data blocks in a receiving block sequence. This may result in a retransmission with minimum delay, while the transmission overhead may be reduced.

The retransmission delay may be even further reduced, if the processing unit is further configured to read a connection identification (CID) from a downlink MAP and recognizes an irregularity, if the MAC PDUs corresponding to the connection identification (CID) are not correctly received. This applies in particular to the case of downlink traffic and the receiver may give a fast response to the error before receiving the latter correct PDU and detecting the missing gap.

If the processing unit is further configured to generate and send out an automatic repeat request feedback message upon successfully detecting a piggyback opportunity in a reverse channel, the signalling overhead relating to a bandwidth request contention for a standalone MAC message may be avoided. Here and in the following, the expression "piggyback" refers to the inclusion of the feedback message into the data field of a further message. In a particularly favourable embodiment of the invention, the processing unit is configured to piggyback an automatic repeat request feedback message with a TCP ACK message in a reverse channel, which is always generated, if the cannel is TCP-based.

The merits of the invention are particularly apparent, if the invention is applied to WiMAX systems.

According to a further aspect of the invention, a method for generating an automatic repeat request (ARQ) feedback message for acknowledgment (ACK) or negative acknowledgment (NACK) of received data units in a wireless communication channel is proposed. The method is executed by a receiving unit in a wireless communication network.

One of the central aspects of the method is that the generation of automatic repeat request feedback messages is delayed until a processing unit of the receiving units has recognized irregularities in the data transmission or until the number of delayed automatic repeat request feedback messages has reached a threshold value.

Further characterizing features of the method according to the invention correspond to the characteristic features of the above described receiving unit the reader may refer to.

Further characterizing features of the invention and advantages thereof will be come apparent from the below description of the further embodiments of the invention. The drawings and the description thereof relate to a specific combination of the characterizing features of the invention. The invention is not limited to this combination and the skilled person will easily be able to find other combinations and sub-combinations of the characteristic features described below without departing from the general idea of the invention.

4. BRIEF DESCRIPTION OF THE DRAWINGS

FIG. 1 shows a flowchart of a method for generating ARQ feedback messages implemented in a receiving unit in a wireless communication network.

FIG. 2 shows a wireless communication network with a schematic representation of the ARQ feedback method.

5. DETAILED DESCRIPTION OF ONE EMBODIMENT OF THE INVENTION

FIG. 1 shows a flowchart illustrating a method for generating an automatic repeat request (ARQ) feedback message for acknowledgement or negative acknowledgement of received data units in a wireless communication channel. The method is implemented in a processing unit 18 of a receiving unit 12 in the wireless communication network.

As shown in FIG. 1, there are multiple possible events triggering the step S10 in which an automatic repeat request (ARQ) feedback message is generated. FIG. 2 gives an overview of the wireless communication network including the receiving unit 12 with its processing unit 18 and a sending/transmitting unit 10 connected with a core network 11.

The processing unit 18 keeps track of the number of continuously received correct blocks from a forward data channel 14 using a counter C which is initiated in a step S12. The ACK feedbacks of the correctly received blocks are buffered in a memory of the receiving unit 12.

In a step S14, which is initiated when a new MAC protocol data unit (MPDU) is received, the processing unit 18 checks if a missing gap in an ARQ sequence is detected in the receiving window. If this is the case, the processing unit assesses the detection of an irregularity and immediately jumps to a step S10 in order to send out an ARQ feedback message including the negative acknowledgement. If no missing gap is detected in the ARQ sequence, the counter C is updated in a step S16 and the processing unit 18 checks in a step S18 if the counter exceeds a predetermined threshold. The threshold value is determined as a product of a factor a with a value between 0 and 1 (preferably 0,5) and the ARQ window size. If the counter exceeds this threshold value, the process jumps to step S10 and sends out an ARQ feedback message immediately.

In a step S20, which is only executed when the ARQ data transmission is downlink, the processing unit 18 of the receiving unit 12 reads the transport connection identification (CID) in the downlink MAP and compares it with the corresponding MAC PDUs it has received in the downlink communication channel 14. If the processing unit 18 identifies a discrepancy between the transport CID and the downlink MAP (it assesses an irregularity in the data transmission and checks in a step S22 if the variable ARQ_RX_Highest_Feedback, which points to the highest numbered ARQ block whose feedback has been sent out, falls short of the variable ARQ_RX_Window_Start-1, wherein the variable ARQ_RX_Window_Start is specified in the IEEE 802.16 standard which is included by reference in this regard. This variable always points to the lowest numbered ARQ block that has not been received or has been received with errors. If this is the case, this means that the detected discrepancy can be resolved only with a retransmission of the corresponding data units and the process jumps to step S10 in order to immediately send out an ARQ feedback message.

In a step S24, the processing unit 18 checks for piggyback opportunities in the reverse channel. In particular, the processing unit 18 checks whether a TCP ACK message 16 (cf. FIG. 2) will be sent out and piggybacks the ARQ feedback message to the TPC ACK message 16 if it is found in a step S26 that a number C>0 of ARQ feedback messages are delayed.

The result of the procedure illustrated in FIG. 1 is a highly adaptive feedback frequency of the ARQ scheme. If regularities are detected in steps S14 or S20, ARQ feedback messages are send more or less immediately and the detection of piggyback opportunities in step S20 enables an highly effective use of resources.

The method according to the invention is illustrated in the above in the example of a Wimax system in which the feedback frequency is not specified nor standardized and the piggyback mechanism can be supported. In general, the concept of the invention can be applied to telecommunication systems in which the ARQ feedback frequency is not specified, in which there is no special channel for the ARQ feedback and in which the piggyback mechanism for the ARQ feedback by data PDU is supported.

It is emphasized that the method according to the invention can be implemented without modifying the proceedings at the transmitting unit 10 and without modifying the format of the ACK/NACK messages for the ARQ feedback. These messages can correspond to the standard specification IEEE 802.16 or IEEE 802.16 (versions 2004 and 2005).

The invention claimed is:
1. An apparatus comprising:
one or more processors; and
one or more memories including computer program code, the one or more memories and the computer program code being configured, with the one or more processors, to cause the apparatus to perform at least the following:
providing a counter to track a number of Automatic Repeat Request feedback messages delayed when an irregularity is not detected in a received data unit;
receiving a data unit in a wireless communication channel from a transmitting unit;
checking the data unit for an irregularity by reading a connection identification from a downlink medium access protocol (MAP) and by recognizing an irregularity when one or more medium access control protocol data units corresponding to the connection identification are not correctly received;
generating an Automatic Repeat Request feedback message when an irregularity is detected;

updating the counter when an irregularity is not detected;
detecting a piggyback opportunity in a reverse channel; and
sending the Automatic Repeat Request feedback message to the transmitting unit when the irregularity is detected, and upon successfully detecting the piggyback opportunity in the reverse channel,
wherein said apparatus is a user equipment.

2. The apparatus of claim 1, wherein said irregularity includes missing or erroneous data blocks in a receiving block sequence.

3. The apparatus of claim 1, wherein the one or more memories and the computer program code are further configured, with the one or more processors, to:
piggyback the Automatic Repeat Request feedback message with a transmission control protocol acknowledgment message in a reverse channel.

4. The apparatus as claimed in claim 1, wherein the one or more memories and the computer program code are further configured, with the one or more processors, to:
store a variable pointing at a highest numbered Automatic Repeat Request block for which an Automatic Repeat Request feedback message has been sent out.

5. The apparatus of claim 1, wherein the one or more memories and the computer program code are further configured, with the one or more processors, to:
generate an Automatic Repeat Request feedback message when the counter reaches a predetermined threshold value; and
send the Automatic Repeat Request feedback message to the transmitting unit when the counter reaches the predetermined threshold value.

6. The apparatus of claim 5, wherein transmission overhead in the wireless communication channel is reduced by providing a variable Automatic Repeat Request feedback frequency by delaying the generation of an Automatic Repeat Request feedback message for acknowledgment or negative acknowledgment of a received data unit in the wireless communication channel until an irregularity is recognized in a received data unit, or until the counter tracking the number of delayed Automatic Repeat Request feedback messages has reached the predetermined threshold value.

7. The apparatus of claim 1, wherein the connection identification is read from a downlink MAP.

8. A method comprising:
providing a counter to track a number of Automatic Repeat Request feedback messages delayed when an irregularity is not detected in a received data unit;
receiving a data unit in a wireless communication channel from a transmitting unit;
checking the data unit for an irregularity by reading a connection identification from a downlink medium access protocol (MAP) and by recognizing an irregularity when one or more medium access control protocol data units corresponding to the connection identification are not correctly received;
generating an Automatic Repeat Request feedback message when an irregularity is detected;
updating the counter when an irregularity is not detected;
detecting a piggyback opportunity in a reverse channel; and
sending the Automatic Repeat Request feedback message to the transmitting unit when the irregularity is detected, and upon successfully detecting the piggyback opportunity in the reverse channel,
wherein the method is performed by a user equipment.

9. The method of claim 8, further comprising:
piggybacking the Automatic Repeat Request feedback message with a transmission control protocol acknowledgment message in a reverse channel.

10. The method as claimed in claim 8, further comprising:
storing a variable pointing at a highest numbered Automatic Repeat Request block for which an Automatic Repeat Request feedback message has been sent out.

11. The method of claim 8, wherein the connection identification is read from a downlink MAP.

12. A computer program product comprising a non-transitory computer-readable storage medium bearing computer program code embodied therein for use with a computer in a user equipment, the computer program code comprising code for performing at least the following:
providing a counter to track a number of Automatic Repeat Request feedback messages delayed when an irregularity is not detected in a received data unit;
receiving a data unit in a wireless communication channel from a transmitting unit;
checking the data unit for an irregularity by reading a connection identification from a downlink medium access protocol (MAP) and by recognizing an irregularity when one or more medium access control protocol data units corresponding to the connection identification are not correctly received;
generating an Automatic Repeat Request feedback message when an irregularity is detected;
updating the counter when an irregularity is not detected;
detecting a piggyback opportunity in a reverse channel; and
sending the Automatic Repeat Request feedback message to the transmitting unit when the irregularity is detected, and upon successfully detecting the piggyback opportunity in the reverse channel.

13. The computer program product of claim 12, wherein the computer program code further comprises code for performing:
piggybacking the Automatic Repeat Request feedback message with a transmission control protocol acknowledgment message in a reverse channel.

14. The computer program product as claimed in claim 12, wherein the computer program code further comprises code for performing:
storing a variable pointing at a highest numbered Automatic Repeat Request block for which an Automatic Repeat Request feedback message has been sent out.

* * * * *